United States Patent [19]

Diehl

[11] Patent Number: 4,848,548
[45] Date of Patent: Jul. 18, 1989

[54] SYNCHRONIZING CLUTCH FOR AUTOMOTIVE MULTIPLE SPEED TRANSMISSION

[75] Inventor: Axel Diehl, Korschenbroich, Fed. Rep. of Germany

[73] Assignee: Ford Motor Company, Dearborn, Mich.

[21] Appl. No.: 97,983

[22] Filed: Sep. 18, 1987

[30] Foreign Application Priority Data

Jan. 21, 1987 [DE] Fed. Rep. of Germany ....... 3701536

[51] Int. Cl.⁴ ............................................ F16D 23/02
[52] U.S. Cl. .................. 192/67 A; 192/53 F; 192/108; 192/114 T
[58] Field of Search ................ 192/53 E, 53 F, 53 G, 192/67 A, 108, 114 T

[56] References Cited

U.S. PATENT DOCUMENTS

| | | | |
|---|---|---|---|
| 3,249,188 | 5/1966 | Maina | 192/108 X |
| 3,537,558 | 11/1970 | Bibbons | 192/108 X |
| 3,620,338 | 11/1971 | Tomita et al. | 192/53 F |
| 3,779,352 | 12/1973 | wörner | 192/53 F |
| 4,069,903 | 1/1978 | Clements et al. | 192/67 A |
| 4,189,041 | 2/1980 | Müller | 192/53 F |
| 4,727,968 | 3/1988 | Chana | 192/53 F |

FOREIGN PATENT DOCUMENTS 0005645 10/1982 European Pat. Off. .

Primary Examiner—Leslie A. Braun
Assistant Examiner—Richard M. Lorence
Attorney, Agent, or Firm—Frank G. McKenzie; Donald J. Harrington

[57] ABSTRACT

In an automotive synchronizing clutch for a multiple speed transmission, a synchronizer sleeve is slidable axially on a system of spline teeth formed on the outer surface of the synchronizer hub. Internal teeth formed on the sleeve are brought into engagement first with locking teeth formed on a synchronizing ring and subsequently with locking teeth formed integrally with the gear wheel that is connected through the synchronizer to a shaft. The ends of the teeth on the sleeve includes recesses into which are seated the clutch teeth of the gear wheel. The synchronizer sleeve is formed with one group of holding teeth formed with recesses on both lateral flanks and another group of guide teeth which have recesses on one lateral flank and a planar surface on the opposite lateral flank. The guide teeth are narrower than the holding teeth and provide on their flanks a surface on which the locking teeth can slide to prevent the locking teeth from becoming seated in the recesses of the holding teeth and to permit the clutch teeth from becoming seated in the recesses of the holding teeth.

9 Claims, 2 Drawing Sheets

SYNCHRONIZING CLUTCH FOR AUTOMOTIVE MULTIPLE SPEED TRANSMISSION

BACKGROUND OF THE INVENTION

1. Field of the Invention

This invention relates to the field of synchronizing clutches of the type that includes a sleeve having internal teeth that contact locking teeth on a synchronizer ring and clutch teeth on a gear wheel.

2. Description of the Prior Art

European Patent 00 05 645 describes a synchronizer for use in a manually operated automotive multiple speed transmission in which a synchronizer sleeve is displaceable axially on external teeth of a clutch hub and has internal teeth whose ends are brought into engagement with clutch teeth located on gear wheels that are journalled on the shaft that supports the clutch hub. The ends of the clutch teeth of the synchronizer sleeve include lateral flanks formed with recesses, which cooperate with the lateral flanks of the clutch teeth on the gear wheels to prevent spontaneous, unintended axial movement of the synchronizer sleeve while torque is transmitted between the gear wheel and the synchronizer hub.

The internal teeth of the synchronizer sleeve include a first group of holding teeth having recesses formed on both lateral flanks and another group of guide teeth whose members are formed with a recess on the lateral flank that faces the intermediate holding tooth. This arrangement prevents automatic axial movement of the synchronizer sleeve during torque transmission and achieves a more favorable disengaging movement during release of the engagement.

The clutches described in the European patent do not include means for synchronizing the rotational speed of the gear wheel and the synchronizer clutch nor do they consider the added complexity that locking of the synchronizer ring located between the clutch hub and the gear wheel has on the Process of engagement and movement of the synchronizer sleeve toward the gear wheel For example, if a synchronizing ring were located in the clutch assembly as described in the European patent, the locking teeth of the synchronizing ring attach to the recesses on the lateral flanks of the holding teeth of the clutch sleeve during movement of the sleeve toward the gear wheel after the speeds of the gear wheel and clutch hub have been substantially synchronized Because of this, the locking synchronizing ring is again pressed against the synchronizing cone on the gear wheel. This process impairs a smooth drivable connection between the synchronizing ring and the gear wheel and produces additional wear on the locking teeth of the synchronizing ring and the recesses of the holding teeth of the synchronizer clutch sleeve.

SUMMARY OF THE INVENTION

An object of the present invention is to provide a synchronizer clutch for a multiple speed ratio automotive transmission in which the synchronizer sleeve can be moved through manual operation of the transmission smoothly and without obstruction into engagement with the clutch teeth of the gear wheel, thereby avoiding wear on the recesses of the holding teeth and the teeth of the synchronizing ring.

This objective is realized in the synchronizer clutch of this invention by having, among the internal teeth of the synchronizer sleeve, a first group of holding teeth having both lateral flanks formed with recesses, and another group of guide teeth having planar lateral flanks without recess and opposite lateral flanks with recesses The width of the guide teeth is narrower than the width of the holding teeth. The locking teeth of the synchronizing ring, which contact the guide teeth on the sleeve, are broader than the locking teeth of the synchronizing ring that contact the holding teeth of the sleeve. The wide locking teeth define a planar surface that remains in contact with the planar surface of the guide teeth during the process of creating a driving connection between the synchronizer and the gear wheel. This contact prevents the locking teeth from entering into the recesses of the holding teeth, but the clutch teeth on the gear wheel are able to become seated within the recesses formed in the holding teeth.

DESCRIPTION OF THE PREFERRED EMBODIMENT

Figure 1:
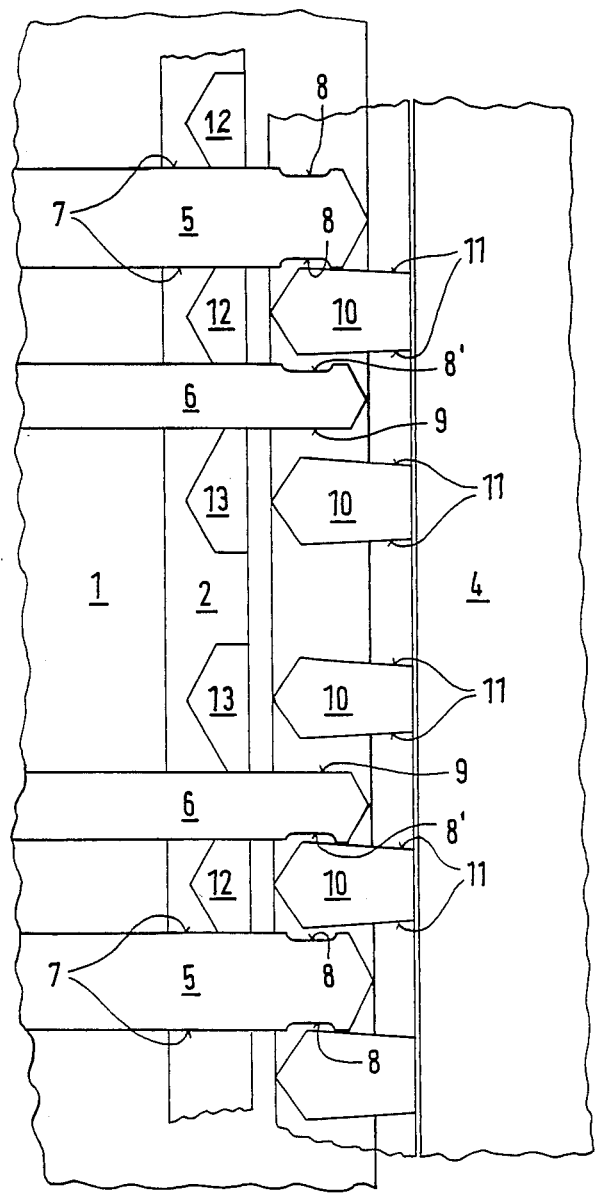
FIG. 1 is a partial view of a synchronizer clutch viewed radially toward the axis, but with the effect of curvature removed to enhance clarity, showing the synchronizer sleeve, the locking synchronizing ring and the clutch teeth of the gear wheels.

In FIG. 1, a synchronizer sleeve 1 cooperates with clutch teeth 10 formed on gear wheel 4 and with the teeth 12, 13 on a locking synchronizing ring 2. Ring 2 and gear wheel 4 are supported rotatably on the shaft but they are free to turn relative to the shaft, each other, and sleeve 1, except when engaged by the teeth 5, 6 of the sleeve. The synchronizer sleeve 1 includes multiple internal teeth arranged in groups, each group comprising holding teeth 5 and guide teeth 6. The axial lengths of the holding teeth and guide teeth are substantially aligned with the axis of the synchronizer sleeve. The holding teeth include recesses 8 located on opposite lateral flanks 7. The guide teeth 6 are spaced angularly about the axis of the synchronizer sleeve, located adjacent each of the holding teeth, aligned substantially with the holding teeth, and include, on the flank that faces the adjacent holding tooth, recesses 8'. The opposite flank 9 of the guide teeth, the flank that faces the guide tooth of another pair of holding teeth and guide teeth on the synchronizer sleeve, includes no recesses.

Gear wheel 4 is formed with clutch teeth 10, which are formed with an undercut 11 by means of which they cooperate with the recesses 8 on the holding teeth of the synchronizer sleeve to prevent spontaneous, unintended axial movement of the synchronizer sleeve while torque is transmitted through the synchronizer between the gear wheel and the synchronizer sleeve.

The locking synchronizing ring 2 includes a set of locking teeth 12, which are spaced angularly about the common axis of the synchronizer sleeve, gear wheel and synchronizing ring. Locking teeth 12 can fit between the holding teeth and guide teeth of a pair of such teeth on the inner surface of the synchronizer sleeve, are aligned angularly with certain of the clutch teeth 10 on the gear wheel, and have substantially the same circumferential width as the corresponding width of the clutch teeth.

The guide teeth 6 are narrower than the holding teeth. This difference in width assures that the guide teeth do not adversely affect the action of the holding teeth in preventing undesired disengagement of the gear wheel 4 with the synchronizer sleeve 1.

In addition to locking teeth 12, the synchronizing ring 2 includes a set of locking teeth 13, which are spaced angularly about the axis of the synchronizing ring and arranged in pairs whose members are mutually adjacent and spaced from other such pairs by a pair of locking teeth 12. The locking teeth 13 formed on the locking synchronizing ring 2 are wider than locking teeth 12 and contact the planar lateral flanks 9 of guide teeth 6 so that a guided sliding contact is achieved between teeth 6 and locking teeth 13.

Figure 2:
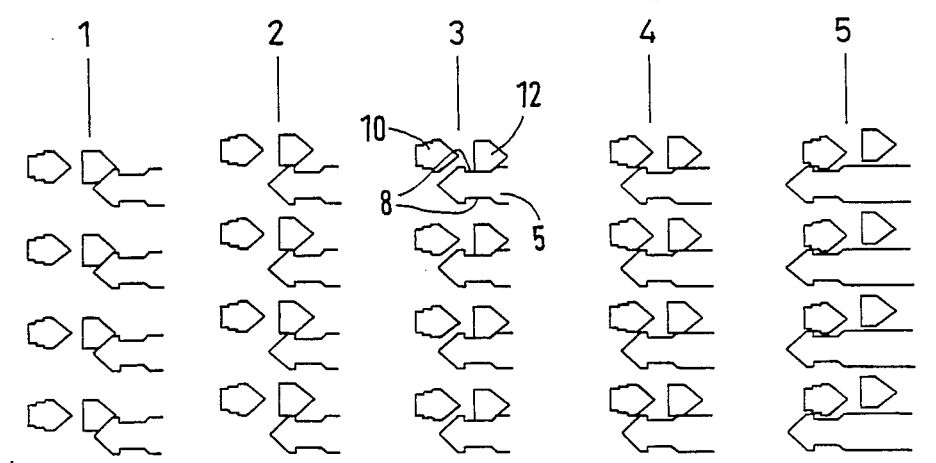
FIG. 2 shows sequentially various stages of engagement of the teeth of the synchronizer sleeve with the dog teeth and clutching teeth of the synchronizing ring and gear known from the prior art.

FIG. 2 shows sequential stages of progressive engagement of a prior art synchronizer sleeve with locking teeth 12 and clutch teeth 10. Referring particularly to phase 3 of FIG. 2, after the synchronizing ring has substantially synchronized the speed of the gear wheel with that of the synchronizer sleeve, locking tooth 12 catches in recess 8 on the holding tooth. This engagement of tooth 12 in recess 8 interferes with the smooth axial movement of holding tooth 5 toward clutch tooth 10 because the synchronizing ring must be rotated, by further axial movement of the sleeve toward the gear wheel, about its axis relative to the synchronizer sleeve so that tooth 12 can disengage recess 8. Thereafter, as phase 4 shows, holding teeth 5 move further axially into contact with clutch teeth 10, which ultimately become seated within recess 8 on the holding tooth of the synchronizer sleeve.

Figure 3:
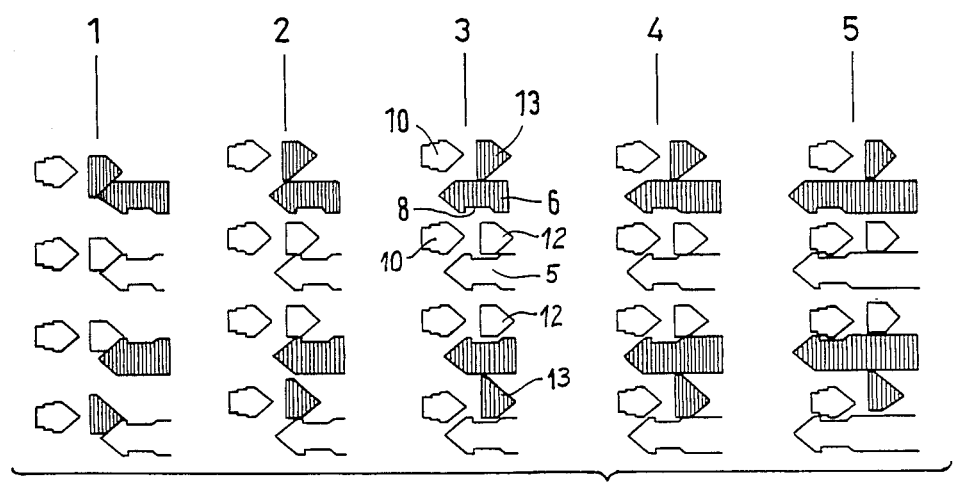
FIG. 3 shows sequentially various stages of engagement of the teeth of a synchronizer sleeve with the dog teeth and clutching teeth of a gear wheel in a synchronizer according to this invention

Referring now to the sequential phases of engagement of the device according to this invention shown in FIG. 3 Here, in phase 1, the inclined surfaces adjacent the tips of guide teeth 6 and locking teeth 13, and those of holding teeth 5 and locking teeth 12, are brought into contact as the synchronizer sleeve moves axially toward the gear wheel. Following further axial movement of the synchronizer sleeve to the position of phase 2, the planar flanks of locking teeth 6 slide in contact with the planar lateral flank of locking teeth 13, and the planar face of holding teeth 5 slides on the planar lateral face of locking teeth 12.

Following further axial movement of the synchronizer sleeve toward the gear wheel, the various a components move to the position, 3 of FIG. 3 where guide teeth 6 and locking teeth 13 remain in sliding contact on adjacent planar lateral faces, which contact prevents locking teeth 12 from being seated within the recesses 8 formed on the lateral faces of holding teeth 5, as is the case in the prior art device illustrated in FIG. 2.

As the synchronizer sleeve moves further axially toward the gear wheel, sliding contact between locking teeth 13 and guide teeth 6 is maintained so that locking teeth 12 clear the recesses 8 on holding teeth 5 and permit unobstructed sliding contact between locking teeth 12 and the faces of holding teeth 5. Thereafter, following additional axial movement of the clutch sleeve toward the gear wheel to the position of phase 5, sliding contact is maintained between teeth 13 and 6, and between teeth 12 and teeth 5. But the gear wheel rotates about its axis relative to synchronizer clutch sleeve, thereby permitting clutch teeth 10 to become seated in recesses 8 in both the guide teeth 6 and holding teeth 5. This completes the drivable connection or engagement between the clutch synchronizer and the gear wheel, which is formed integrally with clutch teeth 10.

Having described a preferred embodiment of my invention, what I claim and desire to secure by U.S. Letters Patent is:

1. A synchronizer for a multiple speed ratio transmission comprising:
   a sleeve adapted for displacement, having multiple teeth spaced circumferentially about the central axis thereof including holding teeth defining recesses on opposite lateral faces, guide teeth having a recess on a first lateral face and a guide surface on the opposite lateral face;
   a synchronizing ring having first and second sets of locking teeth spaced angularly and located alternately about the synchronizing ring; and
   a gear wheel including clutch teeth spaced angularly about the gear wheel and adapted to fit between the teeth of the sleeve, the width of the guide teeth being narrower than the width of the holding teeth, the first set of locking teeth being wider than the second set of locking teeth.

2. The device of claim 1 wherein the the teeth of the ring include a first locking tooth able to fit between a holding tooth and an adjacent guide tooth, and a second locking tooth unable to fit between a holding tooth and an adjacent guide tooth.

3. The device of claim 2 wherein the teeth of the ring are arranged in groups including multiple consecutive first locking teeth and multiple consecutive second locking teeth.

4. The device of claim 2 wherein the width of a first locking tooth is less than the width of a second locking tooth and less than the chordal distance between a holding tooth and a guide tooth.

5. The device of claim 2 wherein the second locking tooth includes a surface on its lateral face adjacent the planar lateral face of the guide tooth, said surfaces of the second locking tooth and guide tooth disposed to contact one another during shifting movement of said sleeve, said contact preventing engagement of the first locking tooth in a recess of the teeth of the sleeve.

6. A torque transmitting device comprising:
   a shiftable sleeve having multiple sets of holding teeth and guide teeth spaced circumferentially about the central axis thereof;
   the holding teeth set formed on the sleeve, each tooth having a pair of lateral faces, each face defining a recess adjacent one end of each holding tooth; and
   the guide teeth set formed on the sleeve, each tooth having a first lateral face defining a recess adjacent one of the faces of the holding teeth, and a second lateral face having a planar surface with no recess formed thereon; and
   a ring having teeth spaced to mesh in an axially locked relationship with the recesses of the locking teeth of the sleeve;
   wherein the teeth of the ring include first locking teeth, each tooth able to fit between a holding tooth and an adjacent guide tooth, and second locking teeth unable to fit between a holding tooth and an adjacent guide tooth.

7. The device of claim 6 wherein the teeth of the ring are arranged in groups including multiple consecutive first locking teeth and multiple consecutive second locking teeth.

8. The device of claim 6 wherein the width of the first locking teeth is less than the width of the second locking teeth and less than the chordal distance between a holding tooth and as adjacent guide tooth.

9. The device of claim 6 wherein each second locking tooth includes a surface on its lateral face adjacent the planar lateral face of the adjacent guide tooth, said adjacent surfaces of the second locking teeth and guide teeth disposed to contact one another during shifting movement of said sleeve, said contact preventing engagement of the first locking teeth in the recesses of the teeth of the sleeve.

* * * * *